United States Patent
Harvey

[11] 3,887,075
[45] June 3, 1975

[54] BICYCLE RACK
[76] Inventor: Jack E. Harvey, 1521 N. High St., Columbus, Ohio 432201
[22] Filed: Aug. 9, 1973
[21] Appl. No.: 387,163

[52] U.S. Cl. .......................... 211/5; 211/22; 70/339
[51] Int. Cl. ...................... E05b 73/00; A47f 7/00
[58] Field of Search .......... 211/5, 17, 20, 22; 70/70, 70/181, 339

[56] References Cited
UNITED STATES PATENTS

| | | | |
|---|---|---|---|
| 1,075,139 | 10/1913 | Borland | 70/339 X |
| 1,153,405 | 9/1915 | Rogers | 70/339 X |
| 1,199,554 | 9/1916 | Iucalano | 70/339 |
| 1,202,444 | 10/1916 | Soleau | 211/20 |
| 2,508,302 | 5/1950 | Stue | 70/233 X |
| 3,786,928 | 1/1974 | Johnson | 211/22 |

*Primary Examiner*—Paul R. Gilliam
*Assistant Examiner*—Andrew M. Calvert

[57] ABSTRACT

A bicycle rack in which bicycles can be supported and secured by locks which secure the two wheels as well as the frame against unauthorized removal. For each bicycle there is provided a locking bar which secures the bicycle frame and holds the front wheels secure between two parallel members extending upright of the rack. Another locking bar is provided for holding the rear wheels secure, the second locking bar being held in locking position depending on the operative position of the first locking bar (i.e., being movable from locking position only when the first locking bar is in the unlocked position). A lock is provided for one of the locking bars which has a pair of parallel cylinders. Meshing gear wheels related to the cylinders insure that the cylinders are turned together and thus two keys (one for each cylinder) are required for release of the bicycle.

8 Claims, 6 Drawing Figures

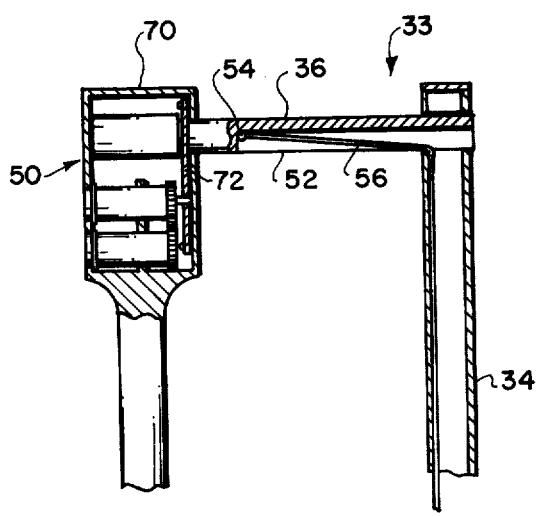
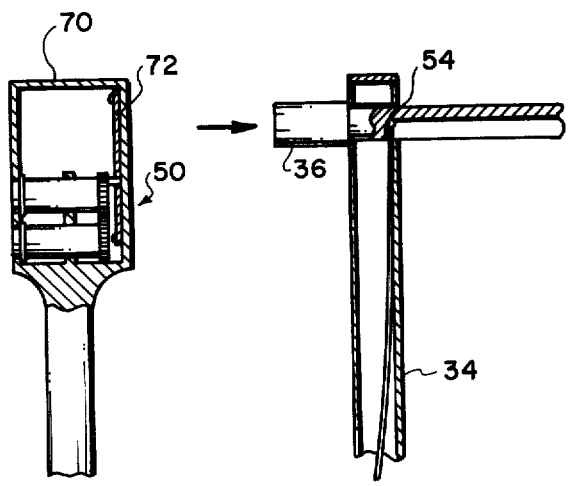
Fig. 3
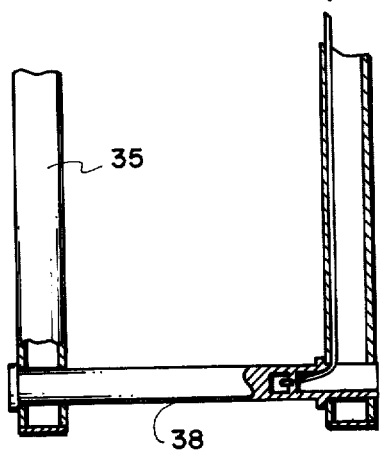
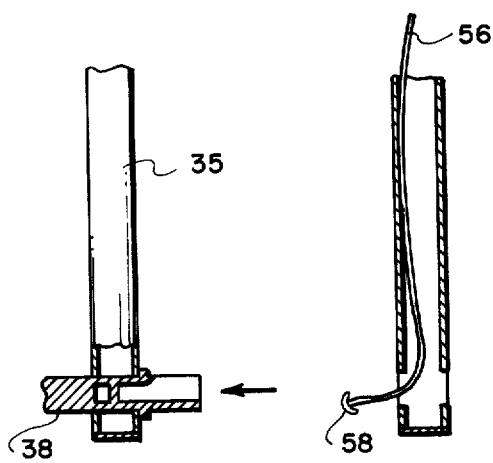
Fig. 4
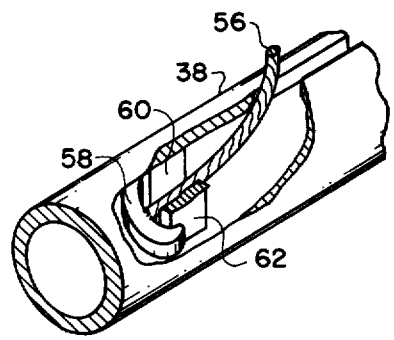
Fig. 5

BICYCLE RACK

BACKGROUND OF THE INVENTION

1. FIELD OF THE INVENTION

The invention is concerned with apparatus and methods of supporting and securing bicycles and comprises in combination: a bicycle rack, locking bars for securing bicycles in said rack, and locks to prevent unauthorized movement of said locking bars.

On campuses and other crowded locations, there has been a great problem in the theft of bicycles and in the theft of tires from bicycles. Often the whole bicycle itself is stolen, but sometimes even though the frame itself is secured, the front wheels and/or the rear wheels of the bicycle are stolen.

Moreover, it is usually desirable for the owner of a bicycle to be able to store the bicycle in a plurality of places rather than always at one particular place, and thus it is necessary to have a lock or key which is universal as to the many places in which it is desired to store the bicycle. Inasmuch as many people will want at times to use the same location, it is necessary to insure that many different persons can use the same location and have a key thereto, but it is also necessary that no two of these people have keys which will unlock any bicycle in any location under all circumstances. My invention disclosed herein was designed to solve the several problems. The invention includes an auxiliary invention relating to the lock which I have designed, which requires two keys for its operation.

2. DESCRIPTION OF THE PRIOR ART

Some attempts were made to solve the problem. Some of these attempts have been patented. For example, Austin U.S. Pat. Ser. Nos. 614,431, 614,432 and 614,433 are directed to bicycle stands provided with locks. However, these devices provide no way for securing the front wheels and/or the rear wheels, nor is there any suggestion requiring two keys of different character to operate any lock.

Also, the Hammond U.S. Pat. Ser. No. 698,277 discloses a device which can serve as a support for a bicycle and also serve to lock the bicycle. Neither does Hammond have any suggestion of securing the frame and both the front and rear wheels nor of requiring two keys to release the bicycle.

Danish patent 63,139 is directed to the same problem. While this patent shows a bicycle rack and means for securing the bicycle crown (steering column) and one but not both of the wheels, he utilizes only a single padlock.

Johnson U.S. Pat. Ser. No. 2,336,936 is directed not to a bicycle but to a lock using two keys. The cylinders of the Johnson device are not parallel nor does it use intermeshing gears.

Corwin U.S. Pat. Ser. No. 612,195 and Beardsley et al., Ser. No. 614,826 relate to bicycle supporting means but do not lock the frame and both wheels. Both patents secure only one wheel.

SUMMARY OF THE INVENTION

In my invention, there is provided a bicycle rack having a plurality of parallel elements extending upwardly of the rack whereby a bicycle may have one of its wheels positioned between a pair of such upwardly extending elements in combination with means for securing a bicycle in appropriate position relative to said rack. This means secures the frame of the bicycle and holds one wheel between the upwardly extending members of the rack. There is also provided in combination with the above, means for securing the other wheel of the bicycle and a two-keyed lock for preventing unauthorized release of the securing means.

My bicycle rack construction comprises a plurality of horizontal bicycle rack frame members and a plurality of upwardly extending bicycle rack frame members secured to the horizontally extending frame members. Between any pair of the upwardly extending members, one of the wheels of a bicycle may be inserted. A plurality of locking devices, each specifically associated with and aligned with one of a pair of said upwardly extending elements, are provided. Each of said associated devices comprises a pair of members (illustrated as curved) secured to the bicycle rack and provided at each end thereof with a locking bar. One of the locking bars can be moved to a position to extend through the frame of the bicycle and thus secure the frame and also hold the bicycle in such position that the wheel must remain in the bicycle rack between its associated two parallel upright members. The other locking bar may be moved to extend between the spokes of the other wheel of the bicycle.

The first mentioned locking bar is provided with a two-key lock which maintains the locking bar in locked position so that neither the bicycle nor one of the wheels thereof may be moved; and the other locking bar extends between the spokes of the other wheel of the bicycle so that this second wheel is also held against release until the two-key lock associated with the first mentioned locking bar is released.

The two-key lock includes two parallel cylinders each carrying a gear wheel arranged so that the two gear wheels are interengaged. The key slots of the two cylinders are not parallel, and inasmuch as the tumblers associated with each cylinder prevent withdrawal of the key except when in a definite angular position of the cylinder, one of the keys must be retained in the lock at all times.

One of the objects of this invention is to provide a safe, secure, convenient and simple means to secure a bicycle and the wheels thereof against theft.

Another object of this invention is to provide such a construction which secures both of the wheels as well as the frame of the bicycle against theft.

A further object of the invention is to provide a construction of the character described which requires two keys in order to release the bicycle from its association with the rack.

A further object of the invention is to provide a new and improved two-key lock.

Further objects of the invention will be apparent from the following specification and claims, and from a consideration of the accompanying drawings.

I have found that the above and other objects of the invention can be obtained by a structure constructed according to my invention and designed to be used in combination with a bicycle rack having a plurality of horizontal members and a plurality of parallel upwardly extending members secured to at least two of the horizontal members. Between any pair of such upwardly extending members, a wheel of a bicycle may be inserted. The structure so constructed according to my invention comprises a locking device, having a pair of parallel tubular members each having one of its ends arranged to be connected by a sliding bar to the associated end of the other tubular member and also each having its other end arranged to be connected by a sliding bar to the associated end of the other tubular member, together with means for concurrently locking both of said bars in such a position as to hold the bicycle, and so that the one wheel is held between the parallel upwardly extending members of the rack to prevent its removal, so that the frame of the bicycle is secured against removal by the first of the sliding members, and so that the second of the sliding members is arranged to extend between spokes of the other wheel of the bicycle to prevent removal of such other wheel.

BRIEF DESCRIPTION OF THE DRAWINGS

In order that my invention may be more fully disclosed, reference is had to the accompanying drawings which illustrate a form of the apparatus embodying the foregoing and such other principles, advantages and capabilities as may be pointed out herein, or as are inherent in the invention. For purposes of clarity and explanation, the following description is explicit and the accompanying drawings are detailed; but it is to be distinctly understood that such exposition is illustrative only and that my invention is not restricted to the particular details that are stated in the specification or shown in the drawings wherein:

FIG. 3 is a view partly in plan of the device of FIG. 2 but having parts broken away and parts shown in section to show more clearly the individual parts of my locking device;

FIG. 4 is a view similar to FIG. 3, but showing the locking bars in their released position instead of in their locked position as they are shown in FIG. 3;

FIG. 5 is a fragmentary view with parts broken away and shown partially in section to illustrate a detail of the locking arrangement for the second locking bar.

DETAILED DESCRIPTION

A Preferred Embodiment of the Invention

Figure 1:
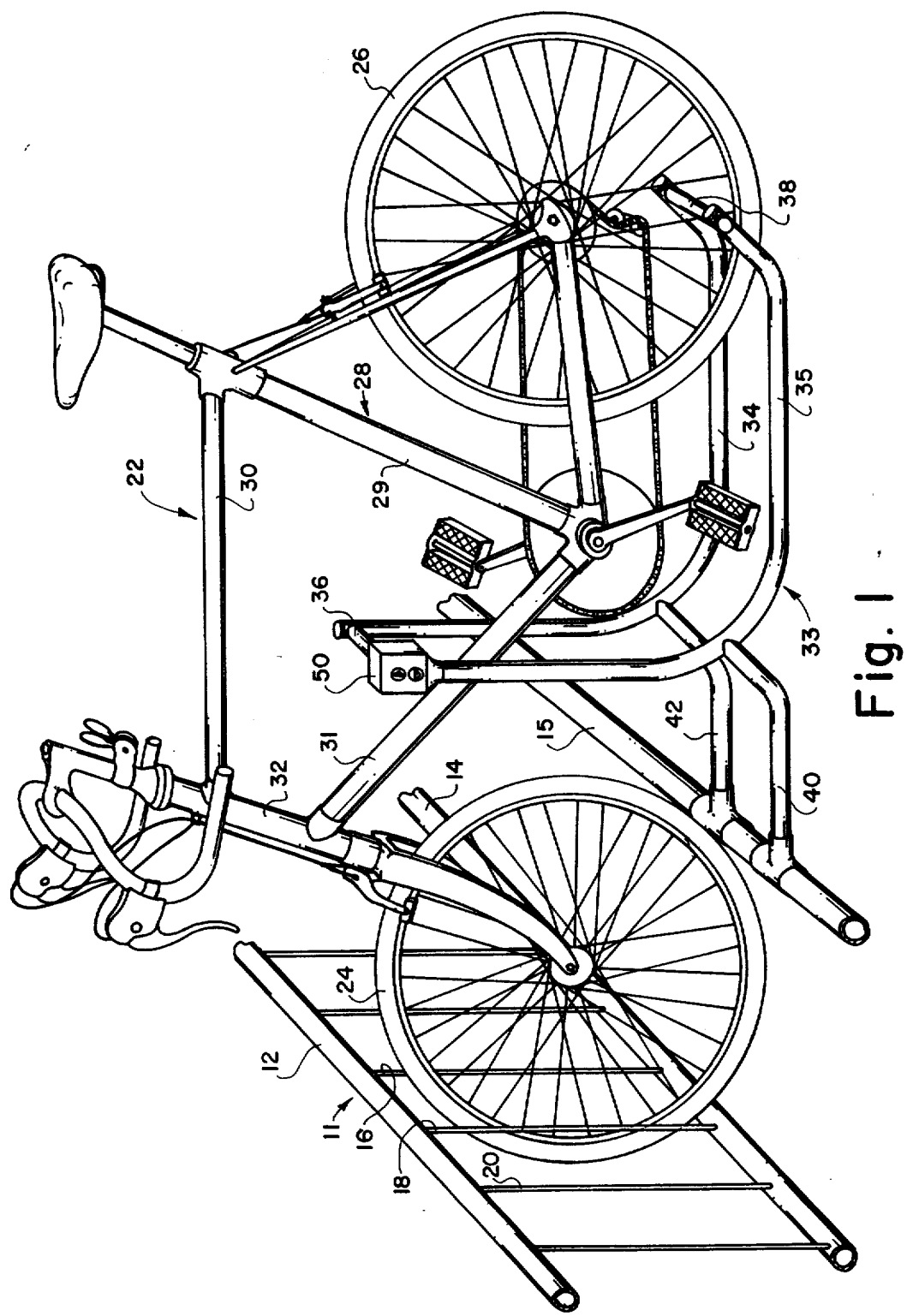
FIG. 1 is a view in perspective of a bicycle rack and, associated and connected thereto, a locking device constructed according to my invention; and also showing a bicycle inserted in the bicycle rack and secured thereto by the locking device constructed according to my invention.
Figure 2:
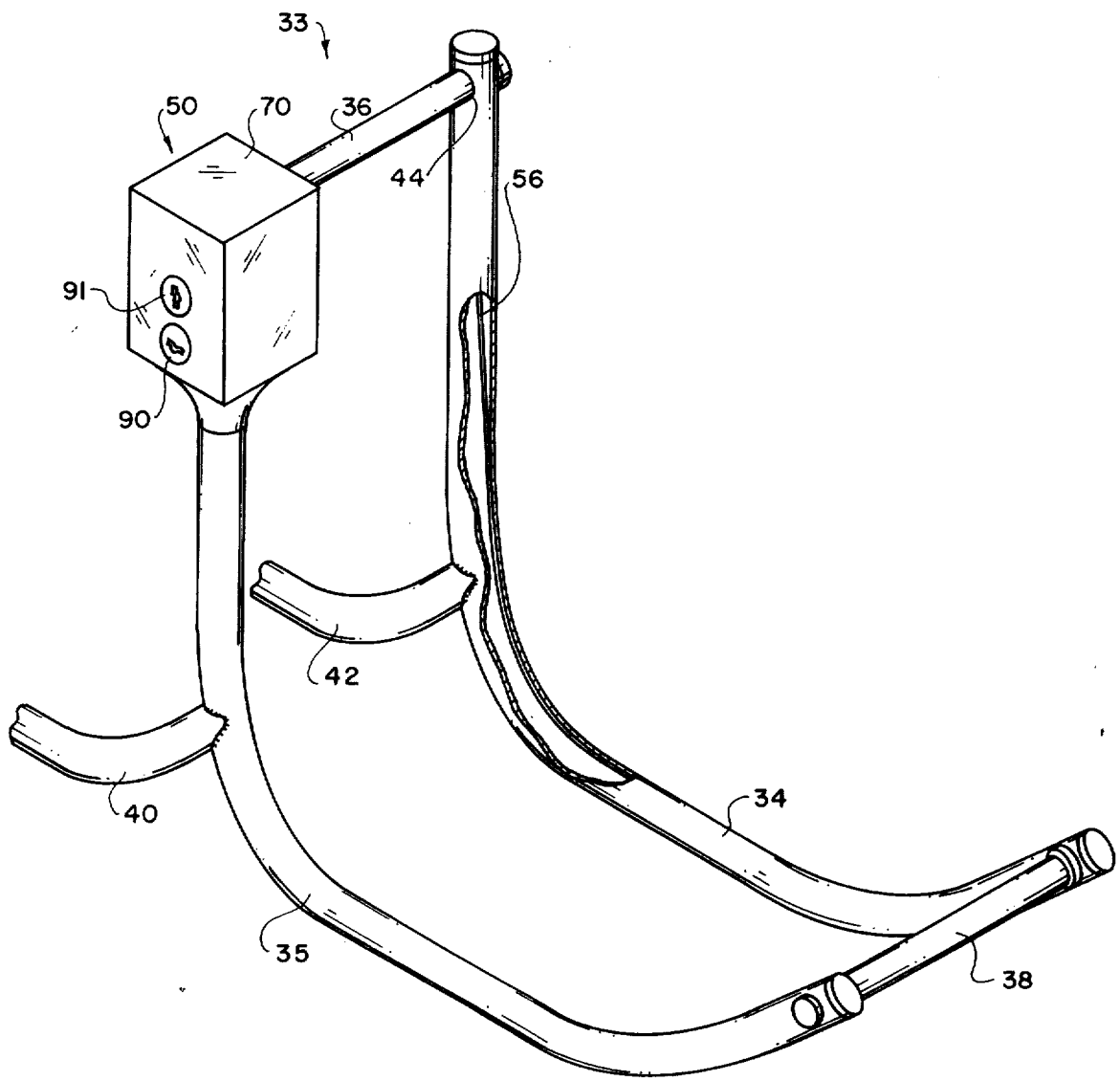
FIG. 2 is a view in perspective of the locking device shown in FIG. 1, having portions connecting the device to the rack broken away and having a portion of one of the tubes also broken away to show the cable by which the second locking bar is held in locking position when the first locking bar is also secured in locking position by the two-keyed lock.

Referring now especially to FIG. 1 of the drawings for a more detailed description of the embodiment illustrated, it may be seen that I have shown a conventional bicycle rack 11 having horizontal members 12, 14 and 15 and a plurality of parallel upwardly extending members such as 16, 18 and 20. A bicycle 22 having its front wheel 24 extending between the upwardly extending parallel members 16 and 18 is also shown. Bicycle 22 is secured in position with the front wheel 24 between the members 16 and 18 by my locking device 33. As may be seen, the device 33 comprises a pair of parallel members 34 and 35 (shown curved), having their ends joined (as shown in FIGS. 1-3, inclusive) by tubular sliding bar locking members 36 and 38. The device 33 is secured to the horizontal member 15 of the bicycle rack 11 by a pair of tubular members 40 and 42.

Referring now further to FIG. 1, it may be seen that the upper ends of the members 34 and 35 straddle the member 31 which, together with frame members 29 and 30 and steering post 32, forms the frame 28 of the bicycle. When the sliding locking bar member 36 is in the position shown, it extends through the frame 28 and thus prevents the withdrawal of the bicycle from its position in the bicycle rack, prevents removal of the bicycle and also prevents removal of the wheel 24 from its position in the bicycle rack. It will also be seen that the other end of the members 34 and 35 straddle the wheel 26 and with the sliding locking bar member 38 in the position shown prevent removal of the wheel 26.

Referring now to FIGS. 2, 3 and 4 for a more detailed description of my locking device 33, it may be seen that the locking bar 36 passes through an opening 44 in the upper end of the member 34 and in the positions shown in FIGS. 1, and 2, and 3 is secured in the upper end of the lock 50 which will be described more in detail later. The sliding locking bar 36 is generally tubular but has a slot 52 (see FIGS. 3 and 4) and is provided with a pin 54 to which there is secured one end of a cable 56. The cable 56 extends through the hollow of the tubular member 36, through the hollow of the tubular member 34, and through a slot 58 and then may be extended as shown in FIG. 3 into the interior of the tubular member 38. As shown in FIGS. 4 and 5, the end of the cable 56 opposite to its connection to the pin 54 is provided with an anchor 58 which may be engaged with abutments 60 and 62 in the interior of the tubular sliding bar locking member 38.

In the position shown in FIG. 4, locking bar member 36 has been released from the lock 50 and has been moved out of the lock so that the cable 56 becomes slack and may be released from any connection with the tubular member 38. However, if the anchor 38 is positioned (when the cable 56 is slack) between the abutments 60 and 62 and the sliding locking bar 36 is moved into engagement in the lock 50, the cable 56 will be tightened so that the anchor may not be released from its connection to the abutments 60 and 62 and the tubular sliding locking bar member 38 may not be moved from its position as shown in FIG. 3.

Figure 6:
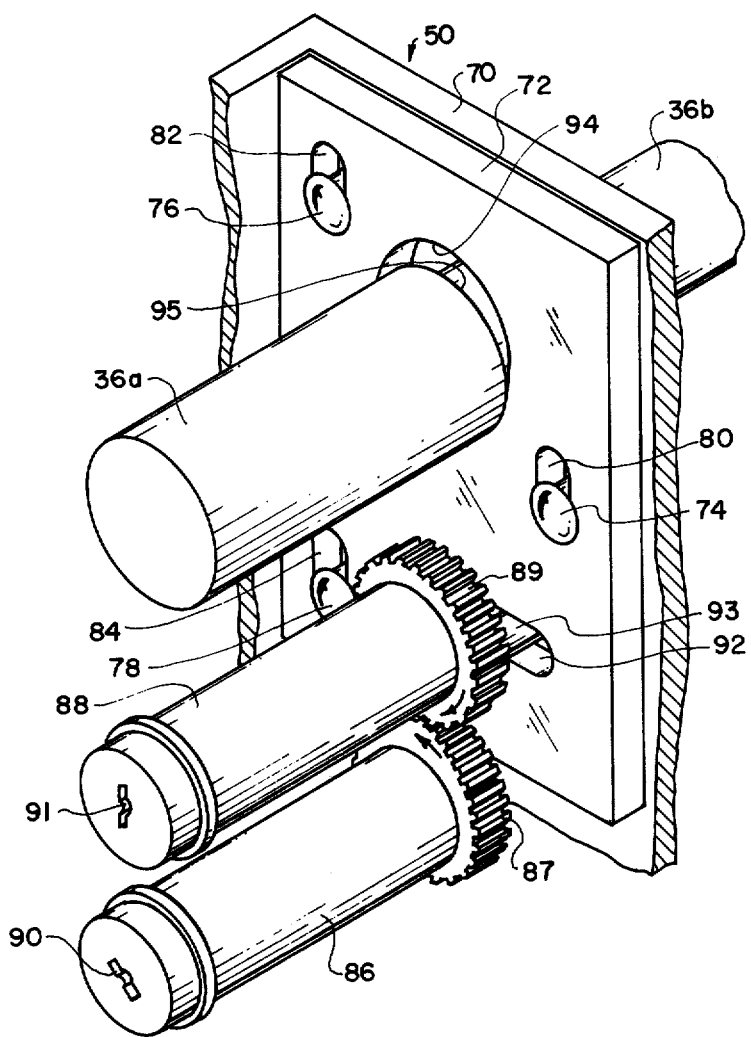
FIG. 6 is a perspective view with parts broken away showing details of the lock forming a part of my invention.

The structure of the lock 50 is generally and partially shown in FIGS. 1 to 4, inclusive, but is shown more in detail in FIG. 6. Therein the lock 50 is shown to include a casing 70, a sliding plate 72, secured slidably to said casing 70 by studs 74, 76 and 78 which pass through elongated slots 80, 82 and 84 respectively, in the plate 72. The lock is also provided with a pair of cylinders 86 and 88 equipped with gear wheels 87 and 89 respectively. Gear wheels 87 and 89 mesh with each other so when one of the cylinders 86 and 88 is turned, the other cylinder is also compelled to turn inasmuch as the internal construction (especially the arrangement of the tumblers) of the cylinders is such that the cylinders cannot be turned unless keys are provided. There must be keys in both of the slots 90 and 91 in order to turn the cylinders.

The plate 72 is also formed with an approximately oval slot 92 approximately aligned with the axis of the cylinder 88. Key slots 90 and 91 are provided. Secured to the gear 89 near the circumference thereof is a pin 93 which is smaller than slot 92 and which, together with the oval slot 92, forms a camming arrangement by which the plate 72 may be moved selectively up and down, the studs 74, 76 and 78, and slots 80, 82 and 84 restraining lateral movement of the plate 72. In FIG. 6, the plate 72 is in its upper (i.e., locked) position. In FIG. 4, it may be in either its lower or upper position. The plate 72 is also formed with a circular hole 94 through which the sliding locking bar member 36 may pass. The locking bar 36 is formed with a shoulder 95 intermediate its enlarged end 36$^a$ and to reduced end 36$^b$ so that when it is in the position shown in FIG. 6, and the plate 72 is in its upper position, the bar 36 is locked and prevented from moving out of the slot 94. However, if the plate 72 is moved toward or to its lower position, the bar may move out of the hole 94. Thus if the cylinders 86 and 88 are rotated 90° from the position of FIG. 6, the sliding locking bar member 36 becomes unlocked and may be moved out of the hole 94, to the position shown in FIG. 4. When the plate is in the position shown in FIG. 6, the locking bar member 36 may not move out of the lock. The key to be inserted in key slot 91 is one of a kind and is used only in connection with that particular lock. For the key slot 90, there will be many keys and all authorized persons will have a key for such slot 90. This arrangement can be reversed. The key for key slot 90 may be one of a kind, and the key for key slot 91 may be common to many persons. Let us assume, however, that the key for slot 91 is one of a kind and is adapted to fit only the particular lock 50 shown. This key may only be removed in the locked position shown in FIGS. 2 and 6. On the other hand, the key for slot 90 may only be removed when the cylinders have been turned angularly. The angle of the rotation of the cylinders between the position at which the two keys may be removed may be any desired angle. As shown, it is about 45°. When the cylinders are turned so that the key for slot 90 may be removed, the key for slot 91 will be held in the lock and will not be able to be removed.

As explained above and as shown in the drawings, the raised position of the plate is the locked position. This of course can be reversed and in fact I prefer that the lowered position of the plate be the locked position so that the weight of the plate tends to hold it in the locked position.

OPERATION

Assume that there is no bicycle in the particular location at which an owner of a bicycle desired to park his bicycle. Also, assume that the arrangements of the tubular members 34 and 35 and the locking bars 36 and 38 are those shown in FIG. 4 and the key in slot 91 is held in the lock 50. Now assume an authorized person (any authorized person) having a key fitting into key slot 90 desires to place his bicycle for safe keeping in the bicycle rack 11. Thereupon, such person moves his bicycle into the position shown in FIG. 1 (between upwardly extending members 16 and 18 and between tubular members 34 and 35). Then after inserting his bicycle (assuming the locking bar 38 is in its outward position as shown in FIG. 4, and the cable 56 being slack), he inserts the anchor 58 between the abutments 60 and 62. He then moves the locking bar 36 to its locking position (as shown in FIGS. 1, 2 and 3) thus tightening the cable 56 and preventing the locking bar 38 from being moved to an unlocked position. He then inserts his key in the lock in the slot 90 and turns his key to the position shown in FIGS. 1, 2 and 6. He is then able to withdraw the key from the key slot 91 and leave the bicycle securely supported and safely locked in position. When he turns the key in slot 90 to the position of FIG. 6, he raises the plate 72 so that the locking bar 36 is held in the locking position, and through the cable 56 the locking bar 38 is also held in the position shown in FIGS. 1, 2 and 3. Then when he withdraws the key from slot 91, no one can remove the bicycle from the rack nor remove either of the wheels 24 or 26 from the bicycle except with a key identical to the one which the owner of the bicycle has taken from slot 91. Inasmuch as there is only one key of this kind, his bicycle is safe, secure and supported until he returns.

It is to be understood that the above described embodiments of my invention are for the purposes of illustration only and that various changes may be made therein without departing from the spirit and scope of the invention as defined in the following claims.

I claim:

1. A system for supporting and securing a plurality of bicycles comprising in combination:
   at least one bicycle rack, having at least one space of a size suitable to receive one bicycle, there being a plurality of spaces overall;
   means comprising a longitudinally slidable bar element associated with each said space for optionally securing a bicycle in any one of said plurality of spaces and for optionally securing additional bicycles in others of said plurality of spaces;
   means comprising a separate two-key lock for each of said spaces and its associated bar element for at times preventing releasing longitudinal movement of the associated bar element, said locks each having two cylinders having separate unlike keys appropriate to each of said cylinders, and each lock having means for insuring that at least one of said keys remains in the lock at all times, one of said keys for each lock being unique for said lock and the other being a key which is operable with all of the locks of said system.

2. A device according to claim 1, for supporting and securing bicycles, comprising in combination:
   means comprising a two-key lock for each said bar element for preventing the releasing movement of said bar element; and
   means comprising said two keys for each lock for operating the lock to permit releasing movement of its associated bar element wherein one of said keys is fitted to operate one cylinder of any of the locks for said spaces and the other of said keys will operate a cylinder of only one of said locks of said spaces and wherein the keys must be inserted in both of the cylinders of any of said locks in order to operate said lock.

3. A device according to claim 1,
   in which the means comprising the slidable bar for securing each bicycle prevents removal of the bicycle in one position of the bar but
   in a second position of the bar allows the bicycle to be removed.

4. A device according to claim 1, in which the bicycle rack comprises
a plurality of horizontal bars positioned in substantially parallel relationship;
a plurality of upwardly extending bars secured to at least two of said horizontal bars and arranged in parallel relationship to each other; and
there is provided in combination with said rack, means for securing a bicycle in said rack including a plurality of pairs of tubular members secured to said rack and a pair of slidable bars, one at each end of said pair of tubular members, for connecting the ends of said tubular members.

5. A bicycle support and securing device having in combination:
a rack which comprises a pair of horizontal bars, one positioned above the other in parallel relationship, a plurality of upwardly extending bars extending between and secured to said horizontal bars and arranged in parallel relationship to each other;
a plurality of pairs of tubular members associated with said rack, said tubular members being parallel to each other and having a lower base portion and upwardly extending end portions; and
slidable bars at each end of each said pair of tubular members movable to and from a position which closes the otherwise open ends of the pair of tubular members,
in which means is provided for holding one of said slidable bars in a closed position whenever the other slidable bar is moved to a closed position.

6. A device for supporting and securing and locking a bicycle having a front wheel and a rear wheel comprising in combination
a support and restraining means for the front wheel of said bicycle, effective when the rear wheel is secured and locked, for preventing removal of said front wheel; and
means for locking said rear wheel, including a longitudinally sliding bar element movable from a position in which it does not interfere with said rear wheel to a position in which it extends through the circumference of said rear wheel, and a lock for at times preventing releasing movement of said bar element, said lock having two cylinders, having a separate unlike key associated with and operative with each of said cylinders, and having means for insuring that at least one key remains in the lock at all times.

7. A device for supporting and securing a plurality of bicycles comprising:
a. a bicycle rack;
b. means for securing bicycles to said rack; and
c. locking means for said securing means comprised of
1. at least two cylinders, each having separate unlike keys;
2. means for synchronizing the movement of said cylinders; and
3. means for preventing the removal of all of the keys from the cylinders at one time, wherein the bicycle rack, the securing means and the locking means form an integral unit.

8. A device for supporting and securing at least one bicycle, comprising in combination:
a. a supporting structure including
at least two substantially parallel upwardly extending members between which one wheel of a bicycle may be placed;
b. a second supporting structure having
at least two substantially parallel elements having upwardly extending end portions between which a bicycle may be placed;
c. a plurality of securing means for securing a bicycle to said elements, said securing means being comprised of:
movable members which may extend through portions of the bicycle, said movable members having means for co-acting with each other;
d. means integral with one of said supporting structures and with said securing means for locking said securing means comprised of:
1. two cylinders each having separate unlike keys;
2. means for synchronizing the movement of said cylinders; and
3. means for preventing the removal of more than one key at a time from the cylinders.

* * * * *